United States Patent [19]
Ramesh et al.

[11] Patent Number: 5,884,299
[45] Date of Patent: Mar. 16, 1999

[54] OPTIMIZATION OF SQL QUERIES INVOLVING AGGREGATE EXPRESSIONS USING A PLURALITY OF LOCAL AND GLOBAL AGGREGATION OPERATIONS

[75] Inventors: Bhashyam Ramesh; Timothy Brent Kraus, both of San Diego; Todd Allan Walter, Poway, all of Calif.

[73] Assignee: NCR Corporation, Dayton, Ohio

[21] Appl. No.: 795,114

[22] Filed: Feb. 6, 1997

[51] Int. Cl.⁶ .................................................. G06F 17/30
[52] U.S. Cl. .................................. 707/2; 707/3; 707/10; 395/200.31
[58] Field of Search .................. 707/10, 1–3; 395/200.3, 395/200.31, 200.32, 200.35

[56] References Cited

U.S. PATENT DOCUMENTS 5,655,080  8/1997  Dias et al. ..................... 395/200.32

OTHER PUBLICATIONS

"Parallel Optimization of Large Join Queries with Set Operators and Aggregates in a Parallel Environment Supporting Pipeline" Myra Spiliopoulou et al., IEEE Transactions on Knowledge and Data Engineering, vol. 8, No. 3, pp. 429–445, Jun. 1996.

*Primary Examiner*—Thomas G. Black
*Assistant Examiner*—Hosain T. Alam
*Attorney, Agent, or Firm*—Gates & Cooper

[57] ABSTRACT

A method, apparatus, and article of manufacture for optimizing SQL queries in a relational database management system involving aggregate and grouping functions. A local aggregation operation is performed on one or more processors of a massively parallel processor (MPP) computer system, wherein rows of the table that are local to each processor are locally aggregated to create one or more aggregate result rows. The aggregate result rows created by each of the local aggregation operations are then re-distributed to one or more processors and coalesced into a global aggregate result row by a global aggregation operation.

42 Claims, 3 Drawing Sheets

OPTIMIZATION OF SQL QUERIES INVOLVING AGGREGATE EXPRESSIONS USING A PLURALITY OF LOCAL AND GLOBAL AGGREGATION OPERATIONS

BACKGROUND OF THE INVENTION

1. Field of the Invention

This invention relates in general to database management systems performed by computers, and in particular, to the optimization of SQL queries in a relational database management system involving aggregate expressions and grouping clauses.

2. Description of Related Art

Relational DataBase Management Systems (RDBMS) using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. A table in a relational database system is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables. One of the most common SQL queries executed by RDBMS software is the SELECT statement. In the SQL standard, the SELECT statement generally comprises the format: "SELECT <clause>FROM <clause>WHERE <clause>GROUP BY <clause>HAVING <clause>ORDER BY <clause>." The clauses generally must follow this sequence, but only the SELECT and FROM clauses are required.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause.

The search condition typically comprises one or more predicates, each of which specify a comparison between two values comprising columns, constants or correlated values. Multiple predicates in the WHERE clause are themselves typically connected by Boolean operators.

The SELECT statement may also include a grouping function indicated by the GROUP BY clause. The GROUP BY causes the rows in the intermediate result set to be grouped according to the values specified in the clause.

A number of column or aggregate functions are also built into SQL, such as MAX (maximum value in column), MIN (minimum value in column), AVG (average of values in column), SUM (sum of values in column), and COUNT (number of rows).

Queries using aggregate expressions return as many result rows as there exist unique "result groups" in the source of the aggregation. A result group is defined as the set of values contained in the fields of a row corresponding to the list of columns or expressions specified in the GROUP BY clause of the query. The value of the aggregate function is the cumulative result of applying the function to the result of the contained expression for each row having the same result group.

While there have been various techniques developed for optimizing the performance of SQL statements, there is a need in the art for optimization techniques involving aggregate expressions and grouping clauses.

SUMMARY OF THE INVENTION

The present invention discloses a method, apparatus, and article of manufacture for optimizing SQL queries in a relational database management system using aggregate and grouping functions. A local aggregation operation is performed on one or more processors of a massively parallel processor (MPP) computer system, wherein rows of the table that are local to each processor are locally aggregated to create one or more aggregate result rows. The aggregate result rows created by each of the local aggregation operations are then re-distributed to one or more processors for a global aggregation operation, wherein the aggregate result rows of the local aggregation operations are coalesced into a global aggregate result row.

An object of the present invention is to optimize aggregate and grouping functions. Another object of the present invention is to optimize SQL queries that are executed by MPP computer systems. Yet another object of the present invention is to improve the performance of aggregate and grouping functions performed by MPP computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention provides fully parallelized aggregate or grouping functions in SQL statements. The present invention extends the scalability of the aggregate or grouping functions in two dimensions. Scalability to more processors or nodes is made fully linear by removing all message traffic during portion of the aggregate or grouping function local to a processor or node. Scalability to very large result groups is vastly improved by adding an adaptive caching mechanism, increasing the number of entries the cache contains and by new search functions to make searching more efficient. Should the cache fill, a spill and local merge mechanism efficiently handles the spills without any message traffic.

Performance of aggregate or grouping functions using the present invention is improved by at least threefold (3×) over a fairly broad range of conditions and by a full order of magnitude (10×) under some conditions. The innovative approach to the full cache problems removed a very significant "knee" from the performance curves for aggregate function performance and made the performance a linear function of number of rows.

The fully parallelized implementation of aggregate or grouping functions of the present invention can perform linearly as the number of rows and/or number of groups increases. In the prior art, RDBMS software sends all rows to a single node or processor to perform final aggregation, which makes it a completely non-scalable operation. As the number of groups grows larger (up to the limits of the size of the database), there is a resulting decrease in the performance improvements provided by massively parallel processor systems.

The performance of aggregate or grouping functions is a key factor in any database system's performance as measured by the Transaction Processing Council D (TPCD) industry benchmark. Aggregation and grouping is a key operation in decision support systems and data warehouse workloads. In many applications, more than 70% of the queries perform aggregation or grouping. Thus, improvements in the performance of aggregation or grouping lead directly to significant improvements in application workloads.

ENVIRONMENT

Figure 1:
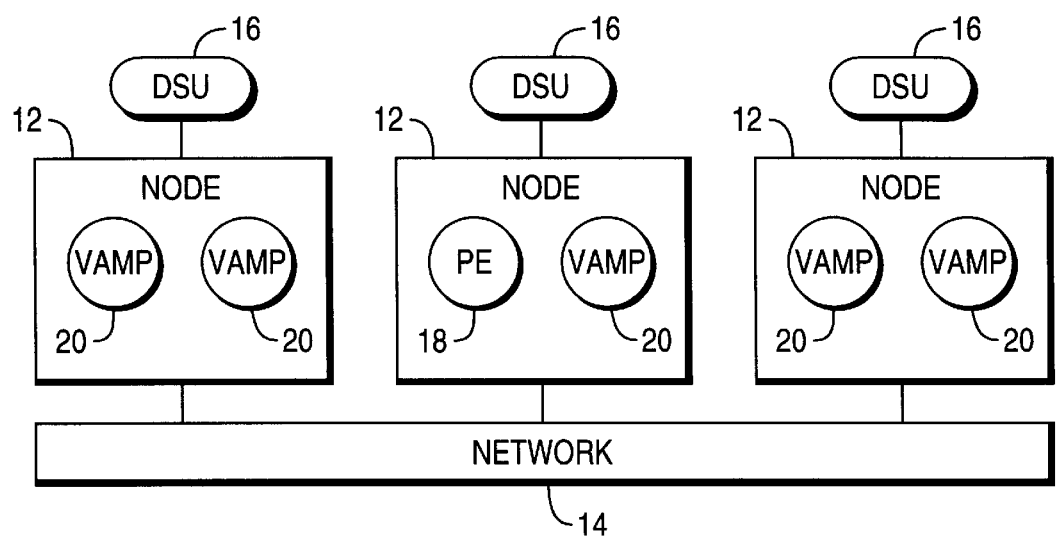
FIG. 1 illustrates an exemplary computer hardware environment that could be used with the present invention.

FIG. 1 illustrates an exemplary computer hardware environment that could be used with the present invention. In the exemplary computer hardware environment, a computer system 10 is comprised of one or more processors or nodes 12 interconnected by a network 14 and coupled to one or more fixed and/or removable data storage units (DSUs) 16, such as disk drives, that store one or more relational databases. The present invention is embodied in a computer program executed or performed by the computer system 10. The computer program itself may be stored, for example, in the memory of the nodes 12 and/or on one of the DSUs 16.

In the exemplary computer hardware environment of FIG. 1, a massively parallel processor (MPP) computer system 10 is illustrated. Each of the nodes 12 execute one or more "virtual processors" such as Parsing Engines (PEs) 18 and Virtual Access Module Processors (VAMPs) 20.

Operators of the computer system 10 use a terminal or workstation to transmit electrical signals to and from the computer system 10 that represent commands for performing various search and retrieval functions, termed queries, against the databases. In the preferred embodiment, these queries conform to the Structured Query Language (SQL) standard, and invoke functions performed by Relational DataBase Management System (RDBMS) software executed by the system 10. Those skilled in the art will recognize, however, that the present invention has application to any database software that performs joins of tables. Moreover, in the preferred embodiment of the present invention, the RDBMS software comprises the Teradata® product offered by NCR Corporation. The RDBMS software performs the functions necessary to implement the RDBMS and SQL standards, i.e., definition, compilation, interpretation, optimization, database access control, database retrieval, and database update.

Work is divided among the nodes 12 in the system 10 by spreading the storage of the rows of each table across all of the VAMPs 20 and the DSUs 16 (which are managed by the VAMPs 20). Thus, each DSU 16 stores some of the rows of each table and work is managed by the system 10 so that the task of operating on the rows is performed by the VAMP 20 managing the DSUs 16 that store the specific rows.

The PEs 18 fully parallelize all functions among the VAMPs 20. As a result, the system of FIG. 1 applies a multiple instruction stream, multiple data stream (MIMD) concurrent processing architecture to implement a relational database management system 10.

The system 10 does face the issue of how to divide a SQL query into smaller sub-queries, each of which can be assigned to an VAMP 20. In the preferred embodiment, a hashing function assigns data rows to VAMPs 20. The columns or fields comprising the primary index of the rows are typically put through a modulo prime number hashing function, which results in a hash "bucket" number. A hash map provides the mapping of hash buckets to VAMPs 20.

There are generally a large number of hash bucket numbers, and each VAMP 20 may be assigned several bucket numbers for both prime and fallback hash maps. This makes it possible to evenly divide the storage data, and hence the processing load, among the VAMPs 20 in the system 10.

When additional VAMPs 20 are configured into a system 10, the new VAMPs 20 are populated by re-mapping some hash buckets from the existing VAMPs 20 to the new VAMPs 20, and then moving the rows corresponding to the re-mapped hash buckets to the DSUs 16 managed by the new VAMPs 20. Thus, only the minimum amount of data necessary is moved during a reconfiguration of the system 10.

EXECUTION OF SQL QUERIES

Figure 2:
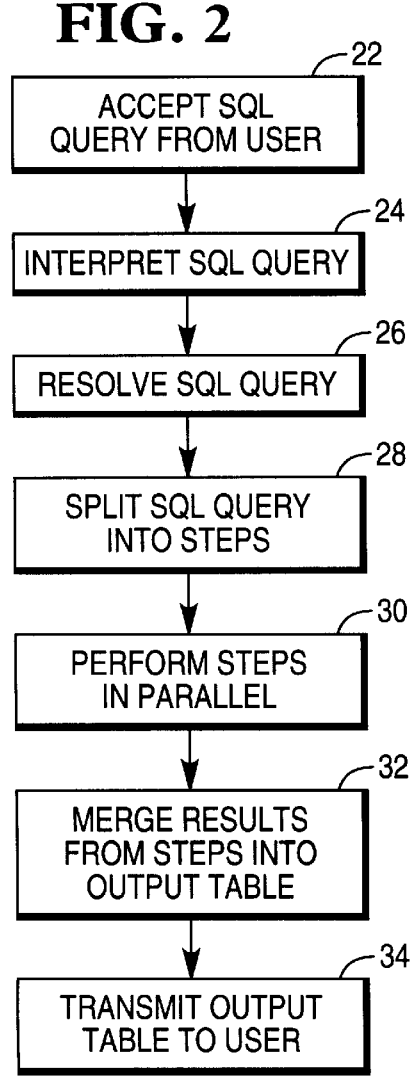
FIG. 2 is a flow chart illustrating the steps necessary for the interpretation and execution of SQL statements, either in source code or in an interactive environment, according to the present invention.

FIG. 2 is a flow chart illustrating the steps necessary for the interpretation and execution of SQL statements, either in a batch environment or in an interactive environment, according to the present invention. Although the preferred embodiment of the present invention uses SQL, those skilled in the art will recognize that the invention disclosed herein may also apply to any RDBMS that performs aggregate or grouping functions on tables. The use of SQL in the preferred embodiment of the present invention is not intended to be limiting in any manner.

Block 22 represents an SQL query being accepted by the PE 18. Block 24 represents the SQL query being transformed by an SQL interpreter function of the PE 18. Block 26 represents the PE 18 resolving symbolic names in the query using a data dictionary that contains information about all the databases and tables in the system. Block 28 represents the PE 18 splitting the query into one or more "step messages", wherein each step message is assigned to an VAMP 20 identified by a hash bucket.

As mentioned above, the rows of the tables are evenly distributed among all VAMPs 20, so that all VAMPs 20 can work at the same time on the data of a given table. If a request is for data in a single row, i.e., a prime index request, the PE 18 transmits it to the VAMP 20 in which the data resides. If the request is for multiple rows, then the steps are forwarded to all participating VAMPs 20. Since the database tables are evenly distributed across the DSUs 16 of the VAMPs 20, the workload of performing the SQL query is balanced between the VAMPs 20 and DSUs 16.

Block 28 also represents the PE 18 sending the step messages to their assigned VAMPs 20. Block 30 represents the VAMPs 20 performing the required data manipulation associated with the step messages received from the PE 18, and then transmitting appropriate responses back to the PE 18. Block 32 represents the PE 18 then merging the responses that come from the VAMPs 20. Block 34 represents the output or result table being transmitted to the user.

PARALLEL AGGREGATION

Figure 3:
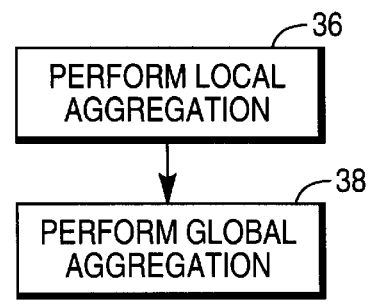
FIG. 3 is a flow chart illustrating the steps necessary for the execution of the parallel aggregation method of the present invention.

FIG. 3 is a flow chart illustrating the steps necessary for the execution of the parallel aggregation method of the present invention. This method would be performed as part of Block 30 in FIG. 2 according to the present invention. Although the preferred embodiment of the present invention uses specific steps and functions as recited herein, those skilled in the art will recognize that the variations on these steps and functions could be used without departing from the scope of the present invention. The use of specific steps or functions in the preferred embodiment of the present invention is not intended to be limiting in any manner.

Block 36 represents one or more of the VAMPs 20 performing local aggregation operations, where rows in each VAMP 20 are locally aggregated to create one or more aggregate result rows. This step is described in more detail in FIG. 4 below.

Block 38 represents one or more of the VAMPs 20 performing global aggregation operations, wherein the aggregate result rows created by each of the local aggregation operations are then re-distributed to one or more of the VAMPs 20 and are coalesced into a global aggregate result row. This step is described in more detail in FIG. 5 below.

In the present invention, the VAMPs 20 generate inter-step data flow of rows, wherein rows flow across multiple steps without producing an intermediate spool file. The spool file is replaced by a stream of messages and all steps participating in the data flow are executed in parallel. For example, rows can flow from a preceding join or qualify step into the aggregate step and from the aggregate step into a following result-row-return step without producing any intermediate spool file. This data flow technique to improve parallelism and reduce disk I/O and the corresponding CPU path length. It recognizes that most aggregate operations are part of a multi-step operation and folds them into a single step.

LOCAL AGGREGATION

Figure 4:
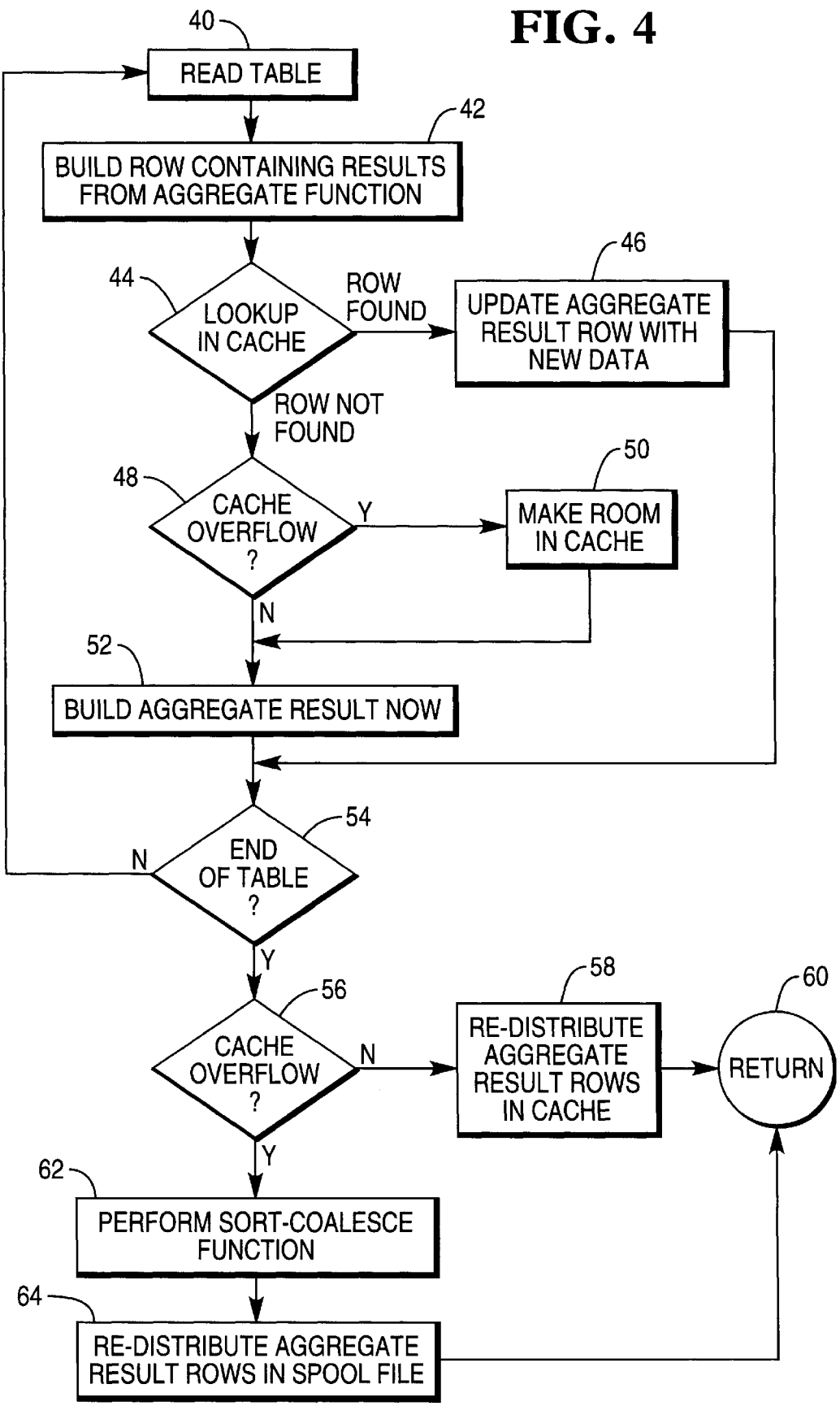
FIG. 4 is a flow chart illustrating the steps necessary for the execution of the local aggregation step of Block 32 in FIG. 3 according to the present invention.

FIG. 4 is a flow chart illustrating the steps necessary for the execution of the local aggregation step of Block 36 in FIG. 3 according to the present invention.

Block 40 represents the VAMP 20 performing a single table read operation. The VAMP 20 scans rows from a table stored on its attached DSU 16, and then qualifies the scanned rows.

Block 42 represents the VAMP 20 building a row containing the results from the specified aggregate function, i.e., MIN, MAX, SUM, COUNT, and AVERAGE, for the scanned rows.

Block 44 is a decision block that represents the VAMP 20 performing a lookup function in the aggregate-result-row cache. The aggregate-result-row cache is a hash table stored in the memory of the VAMP 20 that is keyed by the hash value of the result group. The lookup function hashes on the result group and finds the specific row in the linked list of hash collisions. The hash table and lookup function increases cache utilization by up to 30% depending on the select-row size and improves the CPU path-length due to the quicker look up. If the row is found in the cache, control transfers to Block 46; otherwise, control transfers to Block 48.

Block 46 represents the VAMP 20 updating an already existing row in the aggregate-result-row with the new data.

Block 48 is a decision block that represents the VAMP 20 determining whether there is an overflow of the aggregate-result-row cache, and if so, then Block 50 represents the VAMP 20 making room in the cache. This overflow technique improves utilization of the aggregate-result-row cache from 50% to 95%; in other words, it nearly doubles the effectiveness of the aggregate-result-row cache. When the aggregate-result-row cache is full, the VAMP 20 purges the purgeable portion of the cache to a spool file stored on an attached DSU 16. The purgeable portion of the cache is a small percentage of the full cache; in the current implementation this is 10%. Note that the non-purgeable portion is the remaining 90% and the rows in this portion remain in memory of the VAMP 20.

Block 52 represents the VAMP 20 building an aggregate-result-row and inserting it into the aggregate-result-row cache.

Block 54 is a decision block that represents the VAMP 20 repeating steps 40 through 54, until the end of the table being scanned is reached.

After the end of the table is reached, Block 56 is a decision block that represents the VAMP 20 determining whether the aggregate cache ever overflowed. If not, control transfers to Block 58; otherwise, control transfers to Block 62.

If the aggregate-result-row cache never overflowed, Block 58 represents the VAMP 20 re-distributing aggregate-result-rows in the cache. When there is no aggregate-result-row cache overflow, there is no spool file with the aggregate-result-rows on the attached DSU 16. Thus, only the rows in the cache need to be re-distributed, i.e., one row per VAMP 20 for each unique result group. The aggregate-result-rows in the cache are re-distributed by packaging them into bigger messages for more efficient utilization of the network 10. Thereafter, control transfers to Block 60, which returns to FIG. 3.

If the aggregate-result-row cache overflowed, Block 62 represents the VAMP 20 performing a sort-coalesce function, which sorts and aggregates the spool file produced by the cache-overflow function. The rows in the spool file contain the aggregate-result-rows from the purged portion. There could be multiple rows for the same result group and these duplicates are coalesced to create a single aggregate-result-row for each result group. Therefore, the VAMP 20 reads the purged rows from the spool file, sorts the rows by the result groups, and coalesce rows that are identical on the result groups as they are encountered during the sort.

Block 64 represents the VAMP 20 re-distributing the aggregate-result-rows in the sorted spool file and in the non-purged portion of the aggregate-result-row cache.

GLOBAL AGGREGATION

Figure 5:
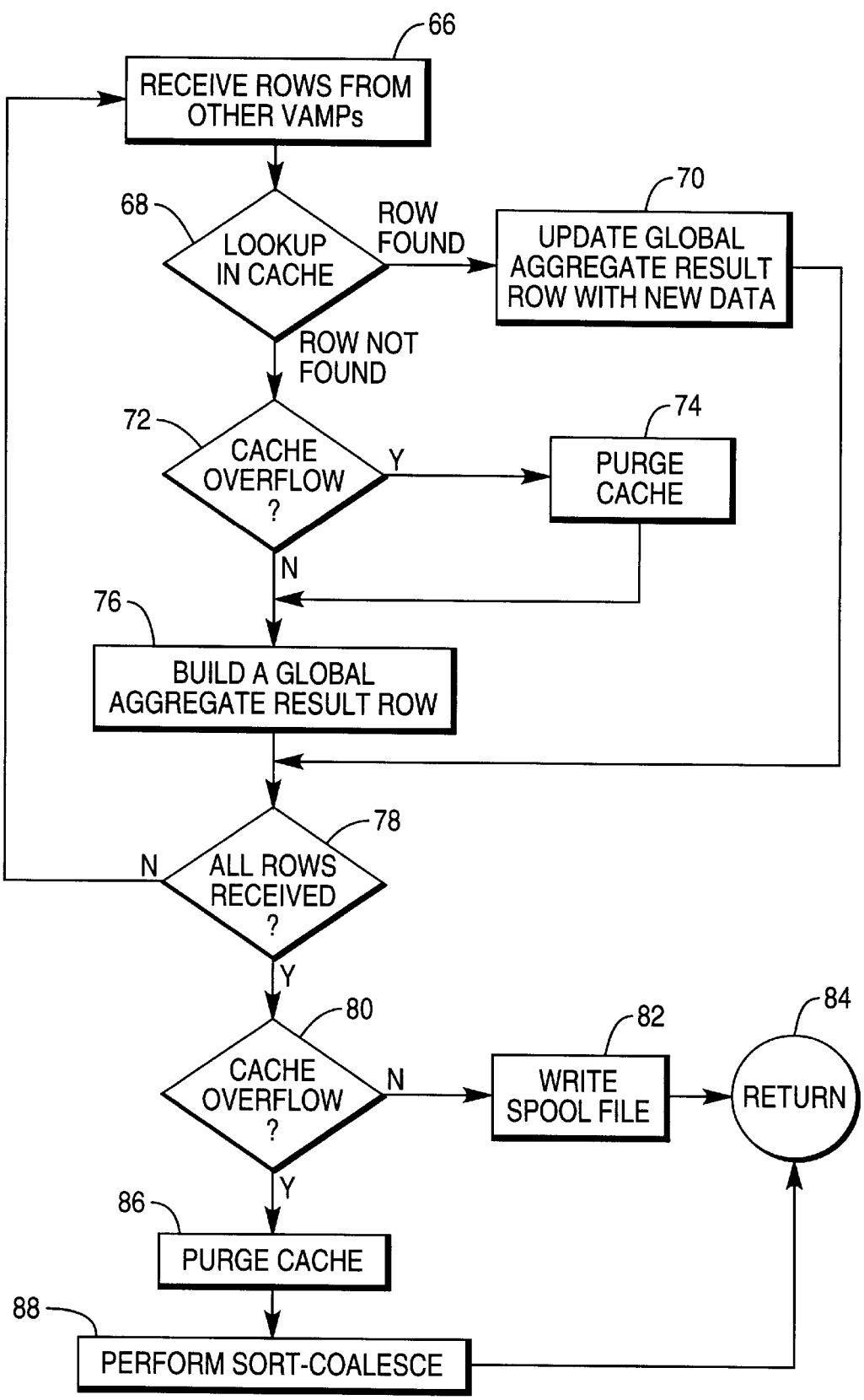
FIG. 5 is a flow chart illustrating the steps necessary for the execution of the global aggregation step of Block 34 in FIG. 3 according to the present invention.

FIG. 5 is a flow chart illustrating the steps necessary for the execution of the global aggregation step of Block 38 in FIG. 3 according to the present invention. The global phase is where aggregate-result-rows are globally coalesced. There is another cache stored in the memory of each VAMP 20 called the global aggregate-result-row cache that is used to aggregate results across the system. Each VAMP 20 redistributes its aggregate-result-rows based on the hash value of the result groups to potentially another VAMP 20 in the system. Each VAMP 20 is responsible for aggregating the rows that hash to it, and it uses the global aggregate-result-row cache for this purpose.

Block 66 represents the VAMP 20 receiving rows from other VAMPs 20. Every VAMP 20 receives rows that hash to it based on the result groups from every other VAMP 20 (i.e., from Blocks 58 and 64 in the local aggregation method of FIG. 4).

Block 68 is a decision block that represents the VAMP 20 performing a lookup function in the global aggregate-result-row cache. The global aggregate-result-row cache is a hash table that is keyed by the hash value of the result groups. The VAMP 20 hashes on the result group and finds the specific row in the linked list of hash collisions. If the row is found, then control is transferred to Block 70; otherwise, control is transferred to Block 72.

Block 70 represents the VAMP 20 updating an existing global aggregate-result-row in the global aggregate-result-row cache with the new data. Aggregating rows as they are received, instead of spooling them to an attached DSU 16 and sorting them, reduces disk I/O and the corresponding CPU time; these improvements will be similar to those experienced with hash joins when compared to sort-merge joins.

Block 72 is a decision block that represents the VAMP 20 determining if there is an overflow in the global aggregate-result-row cache. If so, control transfers to Block 74; otherwise, control transfers to Block 76.

Block 74 represents the VAMP 20 purging some percentage of the cache. This is beneficial since it is probable that the rows for a specific result group are all received close to each other in realtime and the global aggregation for that field is completed quickly.

Block 76 represents the VAMP 20 building a global aggregate-result-row and inserting it into the global aggregate-result-row cache with the new aggregate-result-row. If there is no matching cache entry for the aggregate-result-row, then the VAMP 20 copies the row and creates a new global aggregate-result-row.

Block 78 is a decision block that represents the VAMP 20 repeating Block 66 through Block 78 until all aggregate-result-rows from all VAMPs 20 have been received.

After all aggregate-result-rows have been received, Block 80 is a decision block that represents the VAMP 20 determining whether the global aggregate-result-row cache ever overflowed. If not, control transfers to Block 82; otherwise, control transfers to Block 86.

If the global aggregate-result-row cache never overflowed, Block 82 represents the VAMP 20 writing the spool file to the attached DSU 16 and Block 84 returns control to FIG. 3.

If the global aggregate-result-row cache overflowed, Block 86 represents the VAMP 20 purging the spool file of all remaining entries in global aggregate-result-row cache to the attached DSU 16 and Block 88 represents the VAMP 20 performing a sort-coalesce function. The rows in the spool file contain the global aggregate-result-rows. There could be multiple rows for the same result groups and these duplicates must be coalesced to create a single global aggregate-result-row for each result group. The VAMP 20 reads the purged rows from the spool file, sorts the rows by the result groups, and coalesces rows that are identical on the result groups as they are encountered during the sort. Thereafter, Block 84 returns control to FIG. 3.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any RDBMS that uses aggregate or grouping functions (e.g. SQL-based or other RDBMS) could benefit from the present invention.

In another alternative embodiment, the partitions of the table need not be spread across separate data storage devices. Instead, the partitions could be stored on one or a few data storage devices simply to minimize the amount of temporary data storage required at each of the step of performing the SQL query.

In yet another alternative embodiment, the steps or sub-queries could be performed by one or a few processors, rather than separate processors for each of the steps or sub-queries. The present invention could split the query into steps or sub-queries that are then performed sequentially by a single processor in order to minimize the overhead associated with the processing of the entire query. In addition, the steps or sub-queries could be performed simultaneously on a single processor using a multi-tasking operating environment.

In summary, the present invention discloses a method, apparatus, and article of manufacture for optimizing SQL queries in a relational database management system using aggregate or grouping functions. A local aggregation operation is performed on one or more processors of a massively parallel processor (MPP) computer system, wherein rows of the table that are local to each processor are locally aggregated to create one or more aggregate result rows. The aggregate result rows created by each of the local aggregation operations are then re-distributed to one or more processors for a global aggregation operation, wherein the aggregate result rows of the local aggregation operations are coalesced into a global aggregate result row.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer system, the query being performed by the computer system to retrieve data from a relational database stored in one or more electronic storage devices coupled to the computer system, the method comprising the steps of:

(a) examining the query in the computer system to determine whether the query includes one or more aggregation operations on rows of a table in the relational database;

(b) performing a plurality of local aggregation operations in the computer system, wherein rows of the table are locally aggregated by each of the local aggregation operations to create a plurality of local aggregate result rows; and (c) performing a plurality of global aggregation operations in the computer system, wherein the local aggregate result rows created by the local aggregation operations are re-distributed to the plurality of global aggregation operations to be coalesced thereby to create a plurality of global aggregate result rows.

2. The method of claim 1 above, wherein the computer system comprises a plurality of processors.

3. The method of claim 2 above, wherein the performing step (b) comprises the step of performing the local aggregation operations in two or more of the processors, wherein rows of the table are locally aggregated by the processors in the local aggregation operations.

4. The method of claim 3 above, wherein each of the local aggregation operations comprises the steps of:

scanning rows from the table and qualifying the scanned rows;

building one or more local aggregate result rows containing results from the local aggregation operation for the scanned rows;

caching the local aggregate result rows in a memory of the computer system; and re-distributing the local aggregate result rows from the cache to the plurality of global aggregation operations in the computer system.

5. The method of claim 2 above, wherein the performing step (c) comprises the step of performing the global aggregation operations in two or more of the processors, wherein the local aggregate result rows created by the local aggregation operations are globally aggregated by the processors in the global aggregation operations to create the global aggregate result rows.

6. The method of claim 5 above, wherein each of the global aggregation operations comprises the steps of:

receiving the local aggregate result rows from the plurality of local aggregation operations in the computer system; and building the plurality of global aggregate result rows containing results from the received local aggregate result rows.

7. The method of claim 2 above, further comprising the step of storing distinct sub-portions of the table on a different ones of the processors.

8. The method of claim 1 above, wherein the aggregation operations comprise one or more functions selected from a group comprising MAX, MIN, AVG, COUNT, and SUM functions.

9. The method of claim 1 above, wherein the aggregation operation comprises a grouping function.

10. The method of claim 1 above, wherein the performing step (b) further comprises the steps of:

(1) storing the local aggregate result rows in a cache;

(2) purging a purgeable portion of the cache to a spool file when there is an overflow of the cache; and (3) upon completion of the local aggregation operation, performing a sort-coalesce function on the spool file to create the local aggregate result rows.

11. The method of claim 10 above, wherein the performing step (3) further comprises the steps of:

reading purged local aggregate result rows from the spool file;

sorting the read rows by result groups; and coalescing the sorted rows that have identical result groups.

12. The method of claim 10 above, wherein the performing step (b) further comprises the step of re-distributing the local aggregate result rows from the spool file and the cache to the plurality of global aggregation operations.

13. The method of claim 1 above, wherein the performing step (c) further comprises the steps of:

(1) storing the global aggregate result rows in a cache;

(2) purging a purgeable portion of the cache to a spool file when there is an overflow of the cache; and (3) upon completion of the global aggregation operation, performing a sort-coalesce function on the spool file to create the global aggregate result rows.

14. The method of claim 13 above, wherein the performing step (3) further comprises the steps of:

reading purged global aggregate result rows from the spool file;

sorting the read rows by result groups; and coalescing the sorted rows that have identical result groups.

15. An apparatus for optimizing a query, comprising:

(a) a computer system having one or more electronic storage devices coupled thereto, the data storage devices storing a relational database;

(b) means, performed by the computer system, for examining the query in the computer system to determine whether the query includes one or more aggregation operations on rows of a table in the relational database;

(c) means, performed by the computer system, for performing a plurality of local aggregation operations in the computer system, wherein rows of the table are locally aggregated by each of the local aggregation operations to create a plurality of local aggregate result rows; and (d) means, performed by the computer system, for performing a plurality of global aggregation operations in the computer system, wherein the local aggregate result rows created by the local aggregation operations are re-distributed to the plurality of global aggregation operations to be coalesced thereby to create a plurality of global aggregate result rows.

16. The apparatus of claim 15 above, wherein the computer system comprises a plurality of processors.

17. The apparatus of claim 16 above, wherein the means for performing (c) comprises means for performing the local aggregation operations in two or more of the processors, wherein rows of the table are locally aggregated by the processors in the local aggregation operations.

18. The apparatus of claim 17 above, wherein each of the local aggregation operations comprises:

means for scanning rows from the table and qualifying the scanned rows;

means for building one or more local aggregate result rows containing results from the local aggregation operation for the scanned rows;

means for caching the local aggregate result rows in a memory of the computer system; and means for re-distributing the local aggregate result rows from the cache to the plurality of global aggregation operations in the computer system.

19. The apparatus of claim 16 above, wherein the means for performing (d) comprises means for performing the global aggregation operations in two or more of the processors, wherein the local aggregate result rows created by the local aggregation operations are globally aggregated by the processors in the global aggregation operations to create the global aggregate result rows.

20. The apparatus of claim 19 above, wherein each of the global aggregation operations comprises:

means for receiving the local aggregate result rows from the plurality of local aggregation operations in the computer system; and means for building the plurality of global aggregate result rows containing results from the received local aggregate result rows.

21. The apparatus of claim 16 above, further comprising means for storing distinct sub-portions of the table on different ones of the processors.

22. The apparatus of claim 15 above, wherein the aggregation operations comprise one or more functions selected from a group comprising MAX, MIN, AVG, COUNT, and SUM functions.

23. The apparatus of claim 15 above, wherein the aggregation operation comprises a grouping function.

24. The apparatus of claim 15 above, wherein the means for performing (c) further comprises:

(1) means for storing the local aggregate result rows in a cache;

(2) means for purging a purgeable portion of the cache to a spool file when there is an overflow of the cache; and (3) means for performing a sort-coalesce function on the spool file to create the local aggregate result rows, upon completion of the local aggregation operation.

25. The apparatus of claim 24 above, wherein the means for performing 3) further comprises:

means for reading purged local aggregate result rows from the spool file;

means for sorting the read rows by result groups; and means for coalescing the sorted rows that have identical result groups.

26. The apparatus of claim 24 above, wherein the means for performing (c) further comprises means for re-distributing the local aggregate result rows from the spool file and the cache to the plurality of global aggregation operations.

27. The apparatus of claim 15 above, wherein the means for performing (d) further comprises:

(1) means for storing the global aggregate result rows in a cache;

(2) means for purging a purgeable portion of the cache to a spool file when there is an overflow of the cache; and (3) means for performing a sort-coalesce function on the spool file to create the global aggregate result rows, upon completion of the global aggregation operation.

28. The apparatus of claim 27 above, wherein the means for performing (3) further comprises:

means for reading purged global aggregate result rows from the spool file;

means for sorting the read rows by result groups; and means for coalescing the sorted rows that have identical result groups.

29. A program storage device, readable by a computer system, tangibly embodying one or more programs of instructions executable by the computer systems to perform method steps for executing a query, the query being performed by the computer to retrieve data from a relational database stored in one or more electronic storage devices coupled to the computer system, the method comprising the steps of:

(a) examining the query in the computer system to determine whether the query includes one or more aggregation operations on rows of a table in the relational database;

(b) performing a plurality of local aggregation operations in the computer system, wherein rows of the table are locally aggregated by each of the local aggregation operations to create a plurality of local aggregate result rows; and (c) performing a plurality of global aggregation operations in the computer system, wherein the local aggregate result rows created by the local aggregation operations are re-distributed to the plurality of global aggregation operations to be coalesced thereby to create a plurality of global aggregate result rows.

30. The method of claim 29 above, wherein the computer system comprises a plurality of processors.

31. The method of claim 30 above, wherein the performing step (b) comprises the step of performing the local aggregation operations in two or more of the processors, wherein rows of the table are locally aggregated by the processors in the local aggregation operations.

32. The method of claim 31 above, wherein each of the local aggregation operations comprises the steps of:

scanning rows from the table and qualifying the scanned rows;

building one or more local aggregate result rows containing results from the local aggregation operation for the scanned rows;

caching the local aggregate result rows in a memory of the computer system; and re-distributing the local aggregate result rows from the cache to the plurality of global aggregation operations in the computer system.

33. The method of claim 30 above, wherein the performing step (c) comprises the step of performing the global aggregation operations in two or more of the processors, wherein the local aggregate result rows created by the local aggregation operations are globally aggregated by the processors in the global aggregation operations to create the global aggregate result rows.

34. The method of claim 33 above, wherein each of the global aggregation operations comprises the steps of:

receiving the local aggregate result rows from the plurality of local aggregation operations in the computer system; and building the plurality of global aggregate result rows containing results from the received local aggregate result rows.

35. The method of claim 30 above, further comprising the step of storing distinct sub-portions of the table on different ones of the processors.

36. The method of claim 29 above, wherein the aggregation operations comprise one or more functions selected from a group comprising MAX, MIN, AVG, COUNT, and SUM functions.

37. The method of claim 29 above, wherein the aggregation operation comprises a grouping function.

38. The method of claim 29 above, wherein the performing step (b) further comprises the steps of:

(1) storing the local aggregate result rows in a cache;

(2) purging a purgeable portion of the cache to a spool file when there is an overflow of the cache; and (3) upon completion of the local aggregation operation, performing a sort-coalesce function on the spool file to create the local aggregate result rows.

39. The method of claim 38 above, wherein the performing step (3) further comprises the steps of:

reading purged local aggregate result rows from the spool file;

sorting the read rows by result groups; and coalescing the sorted rows that have identical result groups.

40. The method of claim 38 above, wherein the performing step (b) further comprises the step of re-distributing the local aggregate result rows from the spool file and the cache to the plurality of global aggregation operations.

41. The method of claim 29 above, wherein the performing step (c) further comprises the steps of:

(1) storing the global aggregate result rows in a cache;

(2) purging a purgeable portion of the cache to a spool file when there is an overflow of the cache; and (3) upon completion of the global aggregation operation, performing a sort-coalesce function on the spool file to create the global aggregate result rows.

42. The method of claim 41 above, wherein the performing step (3) further comprises the steps of:

reading purged global aggregate result rows from the spool file;

sorting the read rows by result groups; and coalescing the sorted rows that have identical result groups.

* * * * *